United States Patent [19]
Claassen

[11] 3,961,548
[45] June 8, 1976

[54] GUIDE APPARATUS FOR ROTARY SAWS HAVING FLOATING CIRCULAR SAW BLADES

[75] Inventor: Lutz Claassen, Delta, Canada

[73] Assignee: Hawker Siddeley Canada Ltd., Toronto, Canada

[22] Filed: Mar. 27, 1974

[21] Appl. No.: 455,411

[30] Foreign Application Priority Data
Apr. 3, 1973 United Kingdom............... 15853/73

[52] U.S. Cl..................................... 83/169; 83/170; 83/824; 83/168; 83/821; 308/9
[51] Int. Cl.² ...................... B27B 5/29; B23D 59/02
[58] Field of Search ............. 83/169, 170, 824, 821, 83/168; 308/9

[56] References Cited
UNITED STATES PATENTS

| | | | |
|---|---|---|---|
| 3,373,414 | 3/1968 | Carter | 308/9 |
| 3,376,083 | 4/1968 | Muijderman | 308/9 |
| 3,377,113 | 4/1968 | Wilson | 308/9 |
| 3,623,520 | 11/1971 | Neild | 83/169 |
| 3,661,045 | 5/1972 | Mermelstein | 83/169 |
| 3,703,915 | 11/1972 | Pearson | 83/824 |

*Primary Examiner*—Donald R. Schran
*Attorney, Agent, or Firm*—Carver and Company

[57] ABSTRACT

Guide apparatus for a rotary saw having a circular saw blade freely moveable longitudinally of an arbor which includes a pair of guide plates mounted in a frame on opposite sides of and parallel to the saw blade and adapted to be adjustably positioned longitudinally of the arbor. Each of the plates have a plurality of spiral grooves formed in its face. The grooves have open loading ends, relative to direction of rotation of the saw, opening out of edges of the guide plate so that rotation of the saw blade induces a flow of air into the grooves. The grooves are effectively closed at trailing ends so as to develop air cushions between the saw blade and the guide faces and thus stabilize the saw blade between the guide plates. Means is also provided for introducing a lubricating liquid into the open ends of the grooves.

11 Claims, 4 Drawing Figures

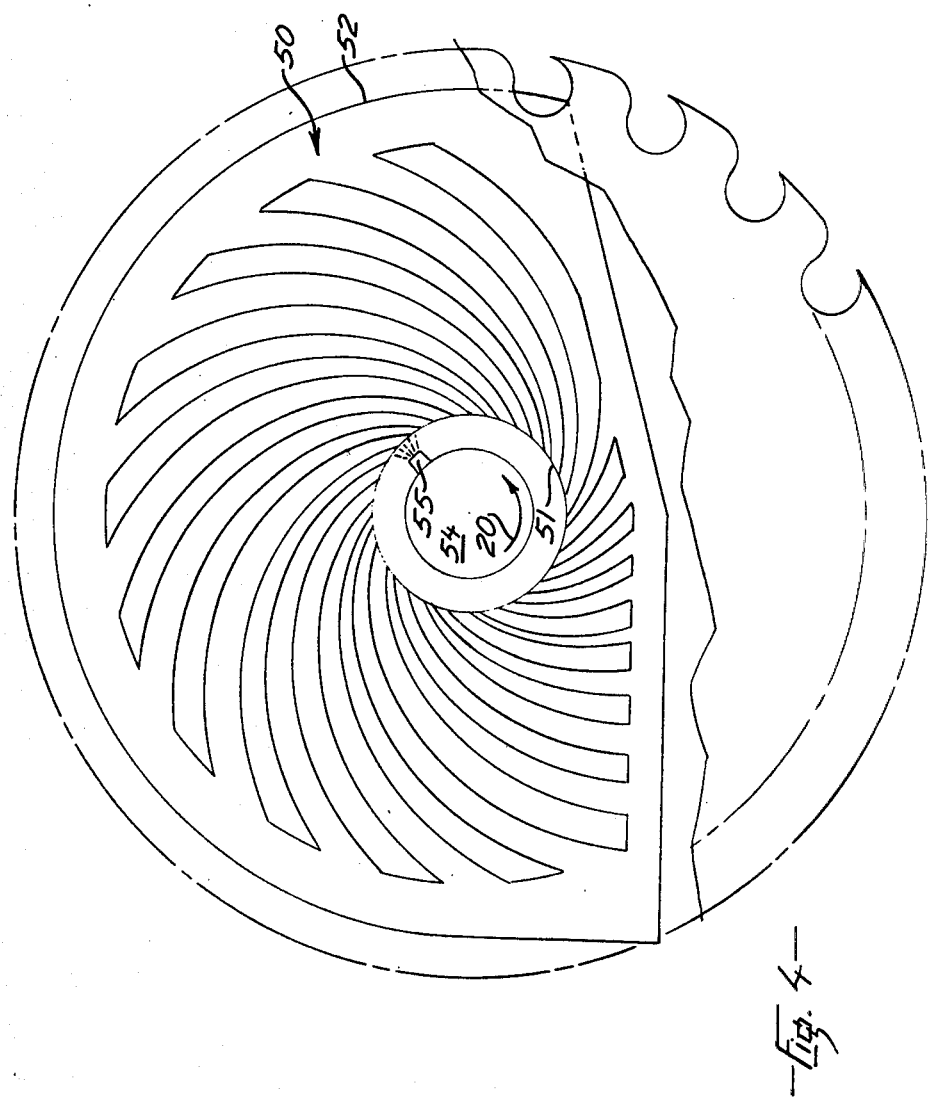

GUIDE APPARATUS FOR ROTARY SAWS HAVING FLOATING CIRCULAR SAW BLADES

BACKGROUND OF THE INVENTION

1. Field of the Invention

This invention relates to circular saws and in particular to guides for stabilizing floating blades.

2. Prior Art

In saw guides, particularly guides of the type of saw in which the saw blade floats freely on its arbor, the guides are usually disposed in counterposed relationship on opposite sides of the saw blade to stabilize the saw axially of the arbor. The lubricant which is most commonly used to reduce friction is water, although some attempts have been made at using an air and water or air and oil mixture.

Some systems of prior art purport to use hydrostatic or hydrodynamic action for lubrication however, such systems have been largely ineffective for reasons of insufficient surface area to stabilize the blade and an inadequate supply of lubricant to maintain a continuous fluid film.

A hydrostatic or hydrodynamic film of lubricant is only effective when it is continuous and stable. Systems of prior art normally include an external pressurized supply of lubricant and have been largely unsatisfactory as they require either a large supply of lubricant or extremely close clearance, less than 0.001 inches, between the guide surface and the saw blade. When the clearance becomes too large a loss of fluid pressure will result and hence a loss of hydrostatic and hydrodynamic lubrication. When air is used as a lubricant this process produces instabilities termed air hammer or whirl.

Furthermore guides of prior art provide a relatively small effective stabilizing area thus necessitating relatively high blade thickness to achieve low vibration levels and hence thin kerf and cutting accuracy.

SUMMARY OF THE INVENTION

The present invention provides an improved saw guide which presents a relatively large guide surface to the saw blade with greatly reduced surface friction thus increasing saw stability, improving cutting accuracy and reducing kerf width.

The saw guide of the present invention uses air as the lubricating fluid at operating speeds but does not require an external pressurized air supply. The saw guide of the present invention presents a grooved saw guide surface to the saw blade into the leading ends of each groove of which air is automatically pumped under the action of the saw blade, the grooves having a spiral configuration so as increasingly to build up fluid pressure toward the trailing ends of the grooves, resulting in stabilization of the saw blade between opposing guides.

A detailed description following, related to the drawings, gives exemplification of apparatus according to the invention which, however, is capable of expression in means other than those particularly described and illustrated.

DETAILED DISCLOSURE

Figure 1:
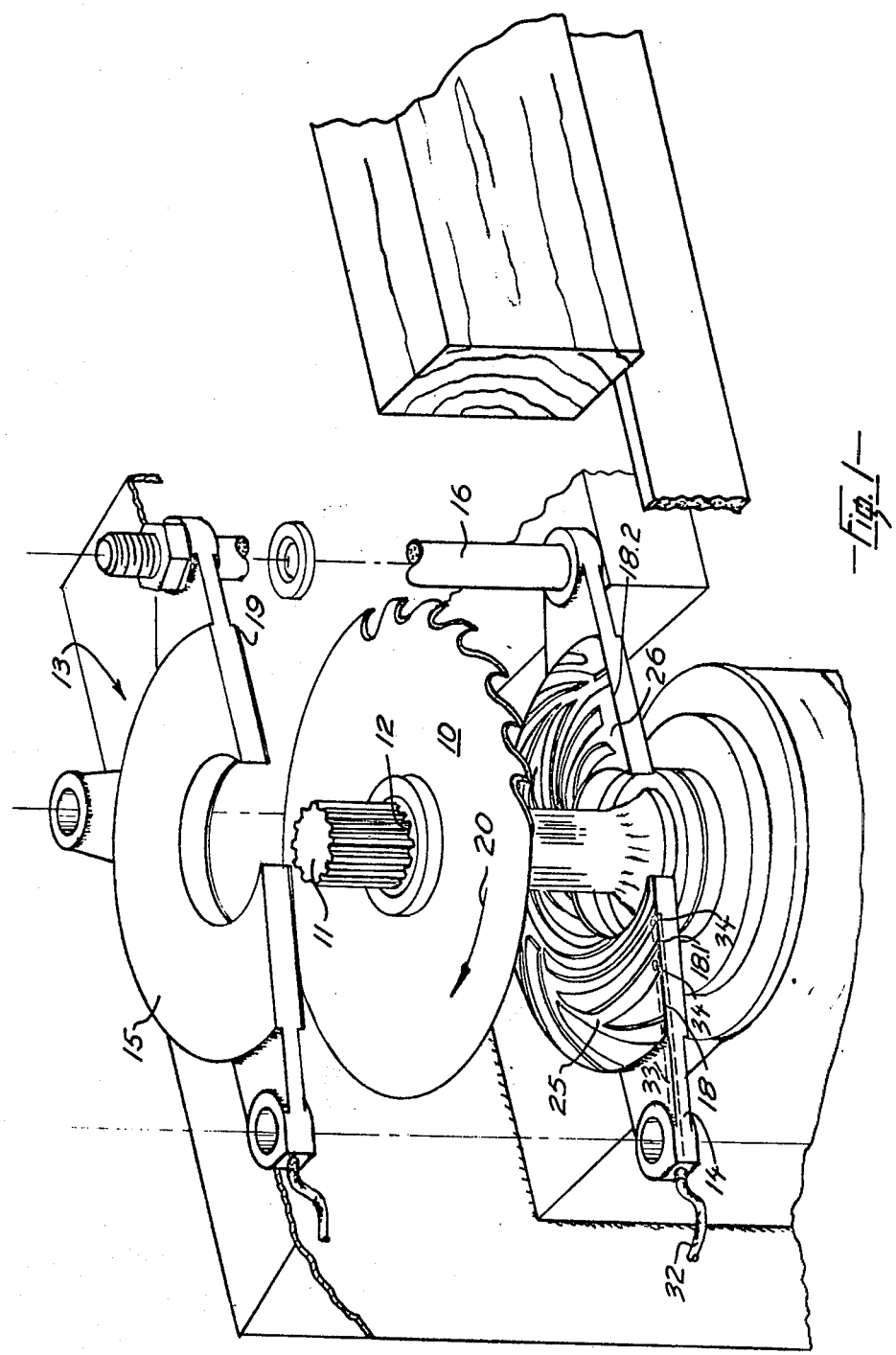
FIG. 1 is a perspective view of a portion of a circular saw and one embodiment of guide apparatus, portions thereof being broken away for clarity of illustration.

With reference to the drawings and in particular to FIG. 1 a portion of a circular saw is shown having a circular saw blade 10 mounted on a driven arbor 11. The arbor, conventionally is splined and the saw blade which can be collarless or collared as shown has a central splined eye 12 having a longitudinally slideable mating fit with the spline arbor. This construction is common in circular saw edgers the blades of which can float longitudinally of the arbor and thus can be suitably positioned for cutting lumber of varied dimensions.

Guide apparatus, generally 13, of the invention includes a pair of guide frames 14 and 15 which are disposed on opposite sides of the saw blade and which are slideably mounted on transverse framework members, severally 16, one being shown partially and which are adjustably secured longitudinally thereof by known means, such as set screws. The guide frames support saw guide plates 18 and 19, respectively, in spaced parallelism between which the saw blade rotates and which stabilize the saw blade in a predetermined position longitudinally of the arbor.

Figure 2:
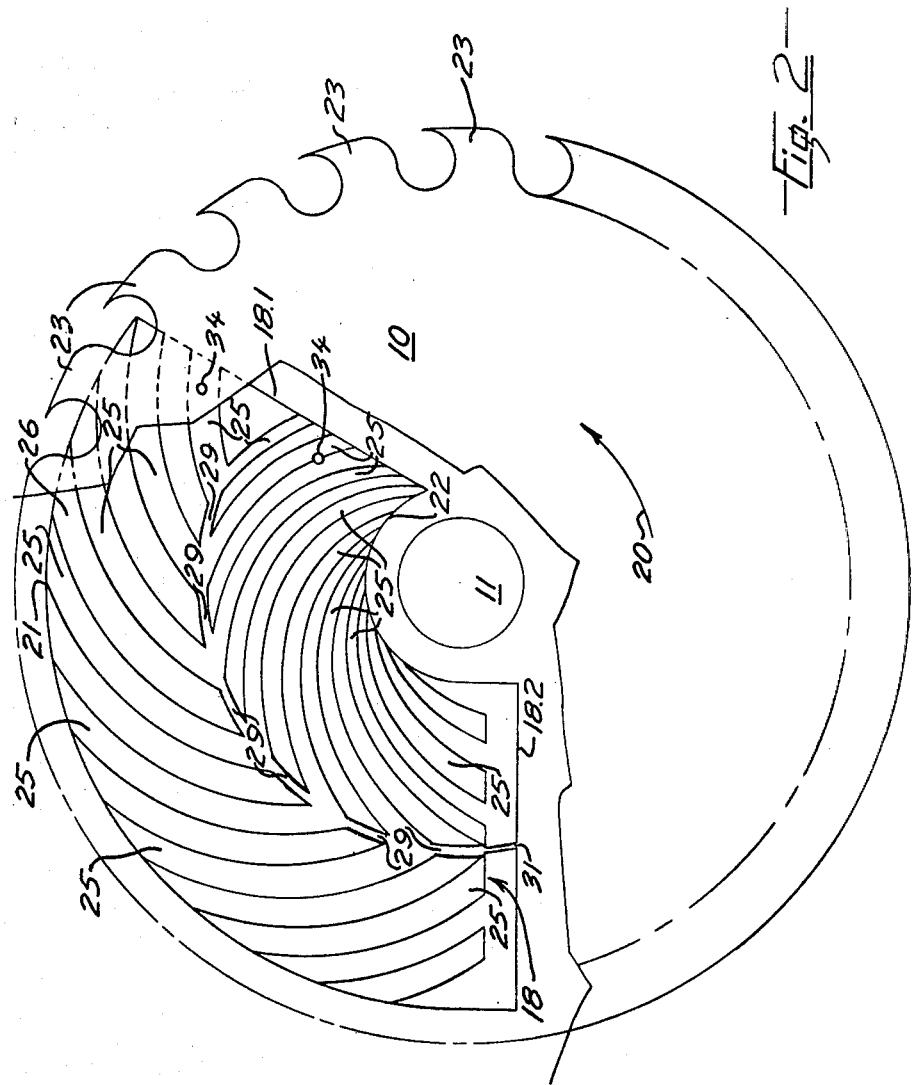
FIG. 2 is a side view of a saw guide plate illustrated in FIG. 1, FIGS. 3 and 4 are views similar to FIG. 2 of other embodiments of saw guide plates of the invention.

The guide plate 18, FIG. 2, is formed of a flat sheet of wear material such as brass, babbit or bronze, or high density phenolic or melamaine thermosetting laminates and takes the form of a segment of a centrally apertured disc and is secured to the guide frame 14 by suitable adhesives or can have a mechanical connection. The guide plate 18 has substantially radially extending leading and trailing edges 18.1 and 18.2, respectively, relative to direction of rotation of the saw blade, arrow 20, and the radii at the outer peripheral edge 21 and the inner peripheral edge 22 is such that when the guide plate is properly positioned on the guide frame 14 the edge 21 is clear of the saw teeth FIG. 2 of the saw and the inner edge 22 is clear of the arbor.

A plurality of grooves 25 extend across the guide face 26 of the guide plate 18. These grooves which are approximately 0.012 inches in depth and have side walls normal to or can be sloping to the plane of the guide face, open out of the outer and inner peripheral edges 21 and 22, respectively, and the leading edge 18.1. The grooves are logarithmic curves with the spiral angle, that is the angle between the spiral lines of the groove walls and the radius lines, remaining constant and are oriented in relation to the rotation of the saw so that air is pumped by the saw blade into open or leading ends of the grooves. Optimum angle between the grooves and the radii is approximately 71°. Other spiral angles and nonconstant spiral angles are, however, effective. It will be seen that some of the grooves 25 spiral out of the inner peripheral edge and the inner half portion of the leading edge while the remainder of the grooves 25, which open out of the outer peripheral edge and the outer half of the leading edge, spiral inwardly and intersect the outwardly spiralling grooves. Each pair of intersecting grooves opens out to the pair of intersecting grooves following through a narrow or restricted joining groove 29. The last pair of grooves open out of the trailing edge 18.2 of the guide plate through a similar restricted groove 31.

Fluid is delivered to the guide plate 18 through a conduit 32 which connects to a passage 33 through the guide frame 14 and thence to the grooves through ports 34.

The guide plate 19 is a mirror image of the guide plate 18 and is mounted in the guide frame 15 in a similar manner and has a similar fluid supply arrangement.

OPERATION

The saw is positioned longitudinally of the arbor by appropriately adjusting the position of the guide frames 14 and 15, clearance between the faces of the guide plates and the saw blade being in the order of 0.003 inches.

Liquid lubrication, e.g. water or oil is injected through ports 34 of the guide plates. Due to rotation of the blade the liquid lubricant is pumped along the grooves towards the trailing ends thereof which are, in effect, closed ends due to the restrictive effect to the passage of fluid through the grooves 29. Pressure ridges or cushions of lubricant are formed near the trailing ends of the grooves. In that portion of the saw blade not subtended by the surface of the guide plate, centrifugal force causes some of the fluid to escape outwards. A substantial quantity of lubricant though is carried around again and is re-pumped towards the pressure ridges, thus only a minimal amount of lubricant is required, e.g. 2 GPH per surface if water is used.

Due to the joining grooves 29 and the groove 31, saw dust particles are carried out of the grooves 25 so that they do not become plugged and then hinder the flow of fluid.

At operating speed a substantial amount of air in addition to the liquid lubricant is being pumped in along the grooves. This fluid mixture sets up a continuous hydrodynamic cushioning film of lubricant which becomes stronger as the space between confronting surface of the guide plates and saw blade reduces, and never completely diminishes when the surfaces are forced apart under the action of extreme lateral loading of the blade. The fluid film consisting of an air, liquid lubricant mixture thus supports the saw blade and provides a stabilizing action.

It will be understood that use of a liquid lubricant may be unnecessary for situations where pneumatic stabilizing alone is sufficient to prevent substantial contact.

Figure 3:
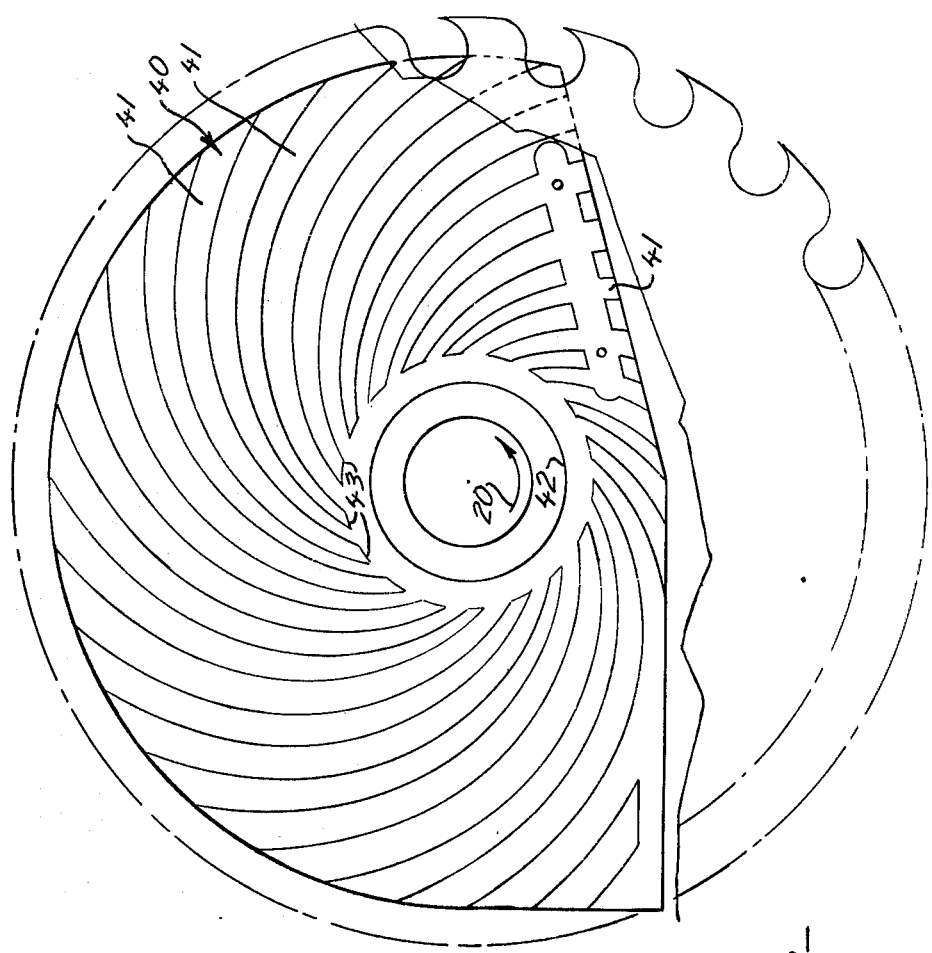

FIG. 3 shows a saw guide plate 40 being another embodiment of the invention.

In guide plate 40 grooves 41 all spiral inwardly towards the arbor, angle between the spiral lines of the grooves and radii being at optimum angle of approximately 71°. The grooves open outwardly and terminate short of the inner peripheral edge 42 of the guide plate so that the grooves are effectively closed at their trailing ends 43.

Guide 40, it is seen, does not have joining grooves similar to the grooves 29 of guides 18 and 19 and is used in saw configurations where carrying of saw dust into the grooves 41 is not a problem.

FIG. 4 shows a saw guide plate 50 being yet another embodiment of the invention.

Guide plate 50 is provided with grooves which spiral outwardly from the inner peripheral edge 51 of the guide plate and terminate short of the outer peripheral edge 52 so that the grooves are effectively closed.

Liquid lubricant for providing lubrication can be directed through suitable passages in the arbor 54 and ejected outwardly through a nozzle 55, onto the guide plates.

I claim:
1. Guide apparatus for a rotary saw having a circular saw blade freely movable longitudinally of an arbor, the guide apparatus comprising:
    a. a pair of substantially circular guide plates having a segment removed therefrom adapted to be disposed on opposite sides of, and spaced from the saw blade, said plates having curved inner and outer peripheral edges clear of the arbor and saw teeth, respectively, and substantially radially extending leading and trailing edges, relative to direction of rotation of the saw blade, and having guide faces extending parallel to the saw blade,
    b. the guide plates having a plurality of spiral grooves extending across the guide faces, the grooves having leading ends, relative to direction of rotation of the saw blade, opening out of at least one edge of each of the guide plates so that rotation of the saw blade induces a flow of air into the grooves,
    c. the grooves being effectively closed at trailing ends so as to develop air cushions between the saw blade and the guide plates.
2. Guide apparatus as claimed in claim 1 including means for introducing a liquid into the open leading end of the grooves.
3. Apparatus as claimed in claim 1 in which the spiral angle of the grooves is 71°.
4. Guide apparatus as claimed in claim 1 in which the grooves are grouped in intersecting pairs, one groove of each pair spiralling outwards from the inner peripheral edges of the guide plates and the other groove of each pair spiralling inwards from the outer peripheral edge.
5. Guide apparatus as claimed in claim 4 including a groove of restricted cross-sectional area joining adjacent intersecting pairs of grooves and a groove of restricted cross-sectional area between the trailing pair of intersecting grooves and the trailing edge of the guide plate to enable the passage of solid particles through the grooves.
6. Guide apparatus as claimed in claim 1 in which the leading ends of the grooves open out of the inner peripheral edge of the guide plates and the grooves spiral outwardly therefrom.
7. Guide apparatus as claimed in claim 1 in which the leading ends of the grooves open out of the outer peripheral edge and leading edge of the guide plate and the grooves spiral inwardly therefrom.
8. Guide apparatus for a rotary saw having a circular saw blade freely movable longitudinally of an arbor, the guide apparatus comprising:
    a. a supporting frame having transverse members disposed parallel to the saw arbor,
    b. a pair of guide frames slideably mounted on the transverse frame members on opposite sides of the saw blade and in parallelism with the latter,
    c. means for adjustably positioning the guide frames longitudinally of the transverse frame member,
    d. a substantially circular guide plate having a segment removed therefrom mounted on each of the guide frames each presenting a guide face parallel to the saw blade,
    e. the guide plate having
        i. curved inner and outer peripheral edges clear of the arbor and saw teeth, respectively, and substantially radially extending leading and trailing edges, relative to direction of rotation of the saw blade,
  ii. a plurality of spiral grooves extending across the plates having leading ends, relative to direction of rotation of the saw blade, opening out of at least one edge of each of the guide plates so that rotation of the saw induces a flow of air into the grooves,
f. the grooves being effectively closed at trailing ends so as to develop air cushions between the saw blade and the guide plates.

9. Guide apparatus as claimed in claim 8 including means for introducing a liquid into the open leading ends of the grooves.

10. Guide apparatus as claimed in claim 8 in which the spiral angle of the grooves is 71°.

11. Guide apparatus as claimed in claim 9 in which the means for introducing liquid comprising, a fluid passage extending into each guide frame, connectable to a pressurized source of liquid, the fluid passage being ported into the grooves adjacent the leading end thereof.

* * * * *